Patented Jan. 20, 1925.

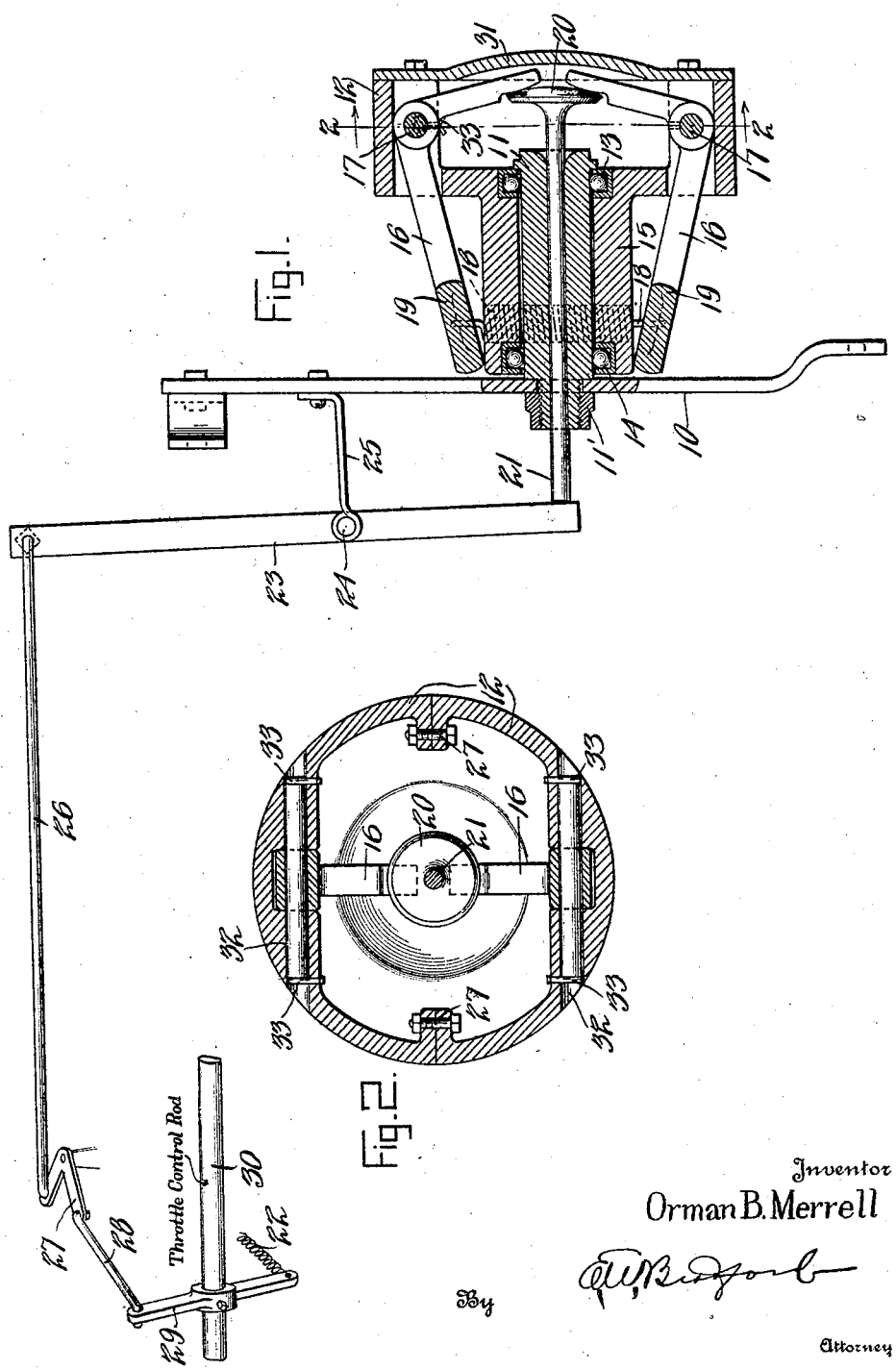

1,523,487

UNITED STATES PATENT OFFICE.

ORMAN B. MERRELL, OF KOKOMO, INDIANA.

GOVERNOR.

Application filed June 28, 1923. Serial No. 648,392.

*To all whom it may concern:*

Be it known that I, ORMAN B. MERRELL, a citizen of the United States, residing at Kokomo, in the county of Howard and State of Indiana, have invented certain new and useful Improvements in Governors, of which the following is a specification.

My said invention relates to a centrifugal throttle regulator for the throttle controlling the fuel supply of an internal combustion engine and it is an object of the same to provide a simple, compact and strong device of the character described intended primarily for application to tractors where there is considerable danger of injury by reason of the prevalence of dust and dirt and the rough handling incidental to the work of the tractor. While intended primarily for use on farm tractors the device is not limited to such use as it may be utilized in other places where sudden changes in the work to be done or the force to be overcome renders it desirable to provide automatic regulating means for varying the fuel supply.

Referring to the accompanying drawings which are made a part hereof and on which similar reference characters indicate similar parts, Figure 1 is a side elevation of my device with parts in section, and Figure 2 a transverse section on line 2—2 of Figure 1.

In the drawings reference character 10 indicates a bracket which forms a sustaining means for the device of my invention, this bracket supporting a journal 11 by means of a threaded neck passing through the bracket and held by a nut 11'. A pulley having a peripheral flange 12 for engagement with the fan belt of a Fordson tractor is supported on this journal by means of roller bearings 13 and 14 running on the journal and held in retainers secured to a hollow extension 15 of the pulley. While the device as here shown is especially designed for use with a Fordson tractor to which it can be applied without boring any holes or doing any other machining, it will none the less be obvious that with slight changes it may be applied to any tractor or to any motor where space permits attachment of a belt.

Bent levers 16 are pivoted at 17 in the pulley and are drawn toward each other near the rear end of the rearwardly extending arms by means of a pair of springs 18 secured to the corresponding ends of oppositely extending lateral projections on said arms forming weights indicated in section at 19. The inwardly directed arms of these levers contact with a disk 20 on a plunger 21 extending through the hollow body of the journal 11 and adapted to be moved in one direction through the same by said inwardly directed arms of levers 16 when the machine speeds up to move the levers against the action of the spring, such movement being augmented by the weights 19.

A spring 22 is provided for returning the plunger 19 to its forward position when the speed decreases, this spring being preferably but not necessarily located near the end of a train of connections leading to the throttle, said train comprising a lever 23 pivoted at 24 on an arm 25 extending from the bracket 10, a link 26 pivoted to the outer end of the lever, a bent lever 27 said lever having one arm attached to link 26 and the other to a link 28, and a lever 29 rigidly secured to a rod 30 fixed to a throttle valve, e. g. the butterfly valve for controlling the fuel supply for the engine of a tractor as described, and to which lever the spring 22 is attached at one end, the other end being secured to a fixed part of the motor.

The pulley may be closed at the front end by a bowed disk 31 to exclude dust and dirt and it is driven by a belt contacting with the peripheral surface of flange 12, which belt as above stated may be the fan belt of a motor. Preferably the pulley is split, the parts being connected by bolts 27, but it may be made in one piece. For holding the pivot pins 17 of the levers in place I provide holes at 32 through the shell of the pulley in which the pivot pins are inserted, and transverse openings at the end of the pin in which cotter pins 33 are placed. These cotter pins being spread at the inside of the pulley form secure holding means for the pins 17 while at the same time they may readily be removed in case of need.

To further exclude dirt I may provide felt washers between the engaging faces of levers 16 and the pulley and about said levers at the rear face of the pulley.

It will be evident to those skilled in the art that various changes may be made in the structure of my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A governor comprising a pulley having primary openings intersecting its circumference on opposite sides thereof and secondary openings extending through the rim of the pulley and intersecting said primary openings, pins in said primary openings, levers in said secondary openings pivoted on said pins, weights at corresponding ends of said levers said weights being connected together by spring means, and means adapted to be operated by movement of said levers for controlling the throttle of the engine.

2. A governor for internal combustion engines comprising a two-part hollow pulley having opposed thickened portions with longitudinal openings therethrough, transverse cut-away portions, levers in said transverse cut-away portions pivoted on pins extending through said longitudinal openings, said levers having weights on their rear ends connected together by spring means and having their forward ends extending radially inward, and means adapted to be actuated by the last mentioned ends of said levers for controlling the throttle of the engine.

3. A throttle regulator for internal combustion engines comprising a pulley having parallel openings intersecting its circumference at opposite sides of its axis, and holes extending through the rim of the pulley said holes intersecting said openings, pins in said openings, cotter-pins in said holes for securing the pins in place, levers pivoted on said pins, weights at corresponding ends of said levers, springs connecting the weighted ends of opposed levers to draw them together, and means operated by movement of said levers toward and away from each other for controlling the throttle of the engine, substantially as set forth.

4. In a throttle regulator for internal combustion engines a bracket adapted to be secured to said engine, a hollow journal fixed to said bracket, a push rod supported in said hollow journal, a hollow pulley mounted by means of a reduced rearward extension on said hollow journal, said pulley pivotally supporting at its periphery a plurality of bell-crank levers with radially and rearwardly extending arms, said rearwardly extending arms projecting through said pulley and overlying its rearward extension, weights at the outer ends of the last mentioned arms having spring means for securing them together, the radial ends of said levers normally contacting the head of the push rod, a lever for controlling the throttle of the engine pivoted intermediate its ends on said bracket and having one end normally in engagement with said push rod, substantially as set forth.

In witness whereof, I have hereunto set my hand and seal at Kokomo, Indiana this 23rd day of June, A. D. nineteen hundred and twenty-three.

ORMAN B. MERRELL. [L. S.]

Witnesses:
J. G. MILLIKAN,
C. W. GORDON.